Patented Apr. 18, 1933

1,904,582

UNITED STATES PATENT OFFICE

RHEA N. WATTS, OF BATON ROUGE, LOUISIANA, ASSIGNOR TO STANDARD-I. G. COMPANY

METHOD FOR RECOVERING VALUABLE MATERIALS FROM SPENT CATALYSTS

No Drawing.    Application filed April 11, 1931. Serial No. 529,553.

This invention relates to the recovery of valuable materials from spent or used catalysts and more particularly comprises a method for recovering catalytically active sulfides of metals of the VI group of the periodic system, such as molybdenum, tungsten and chromium from spent catalytic mixtures used in the hydrogenation of carbonaceous material.

In the hydrogenation of carbonaceous material under high pressure and at elevated temperature the sulfides of metals of the II, IV and VI groups of the periodic system, either alone or in combination, have been found useful as catalytic materials. The sulfides of molybdenum, tungsten and chromium preferably admixed with the sulfides of zinc and magnesium are particularly effective.

It is known that certain sulfides of these metals are more catalytically active than others, and it has been found that by heating the oxides or other compounds of these metals in the presence of hydrogen and sulfur-containing materials for a period varying from about 50 to 400 hours these compounds can be substantially completely converted to the active sulfides. For reasons little understood at the present time, the activity of these sulfided catalysts gradually decreases with use, and it becomes necessary to reclaim and reactivate the valuable constituents.

In a previous application Serial No. 483,140 filed September 19, 1930, I have described a method for the recovery of molybdenum, tungsten and chromium from spent catalytic mixtures. By that method, however, these metals are recovered as the oxides, and they must therefore be subjected to a long period of activation with hydrogen and sulfur before they are again converted to the catalytically active sulfides.

I have now found that it is possible to recover these valuable materials directly in the form of the active sulfides, thus eliminating the long activation period. This improved method of recovery will be fully understood from the following description.

The spent catalyst is first treated with a suitable solvent for removing gummy residues, coke, and other hydrocarbon material which may adhere to it. For this purpose carbon disulfide is preferably used, but any other suitable solvent is satisfactory. The cleaned catalyst is then digested with hydrochloric acid conveniently at room or normal temperatures, although higher temperatures may be used. It is preferable to use a fairly strong concentration of acid, say about 5 to 7 normal. This treatment dissolves all but the sulfides of molybdenum, chromium and tungsten, unless there is some other hydrochloric acid insoluble material present, such as an inert supporting material, alumina, silica, activated charcoal, and the like. In general however, the catalytic mixtures comprise the sulfides of molybdenum, chromium or tungsten, in combination with zinc or magnesium sulfides, and these latter sulfides are soluble in strong hydrochloric acid.

It is preferable to remove the hydrogen sulfide formed in this digestion with hydrochloric acid because it may convert the active VI group sulfide into a finely divided form unsuited for re-use. The hydrogen sulfide may be blown out with inert gases, or may be oxidized by an acid oxidizing agent, such as nitric acid, potassium permanganate and the like which may be added in small quantities.

The digestion with hydrochloric acid is continued until no further solution appears to take place and the undissolved active sulfide, or active sulfide and inert materials if such are present, are separated from the liquid by any suitable means, such as filtering, settling and decanting or centrifuging. The residue contains substantially all the active sulfide originally present. Small quantities of impurities such as oxides of iron and the like may be present in it, but these may be removed by treatment with a dilute mineral acid, say a 1 to 2 normal solution of hydrochloric, nitric or sulfuric acids. The purified sulfide may then be washed with water and dried. In the digestion of the spent catalyst with hydrochloric acid, some molybdenum may be dissolved. In this event the molybdenum so dissolved may be recovered from the solution by partial neutralization with ammonia, whereupon the molybdenum is precipitated as molybdenum trioxide which may be recovered and subsequently converted to the active sulfide.

The recovered product is substantially equivalent in activity to the freshly activated catalyst which has been subjected to a prolonged treatment with hydrogen and sulfur containing compounds. In some cases the activity of the recovered product is superior to that of the original active sulfide. It may be used directly in the hydrogenation without preliminary treatment.

The recovered sulfides may be mixed with other materials such as zinc or magnesium oxides, inert supporting materials, preferably those soluble in hydrochloric acid and the mixtures used in the form of finely divided particles suspended in the oily material to be hydrogenated, or molded into small lumps of spherical, cubical, cylindrical or other convenient shapes and the lumps supported on trays or by other means in the hydrogenation reactor.

As an example, a spent catalyst containing the sulfides of molybdenum, zinc and magnesium is treated with carbon disulfide to remove hydrocarbon material, and is then digested at room temperature with 6 normal hydrochloric acid containing a small amount of nitric acid. The undissolved residue is filtered off, and is washed first with dilute hydrochloric acid and then with water. After drying, the recovered sulfide is mixed with magnesium oxide in the proportion of about 80 parts recovered molybdenum sulfide to 20 parts magnesium oxide, the mixture is moistened and compressed into small lumps in a hydraulic press.

A comparison of the activity of the catalyst containing recovered molybdenum sulfide with another catalyst containing about 50 parts fresh molybdenum oxide, 30 parts zinc oxide, and 20 parts magnesium oxide follows:

Each catalyst is used under identical conditions of temperature, pressure, feed rate, and hydrogen rate in the hydrogenation of a rerun Mid-Continent gas oil, having the following inspection:

| | |
|---|---|
| Gravity A. P. I. | 40.2° |
| Initial boiling pt. | 218° F. |
| Final boiling pt. | 606° F. |
| Sulfur | .221% |
| Aniline point | 145° F. |
| Color (Robinson) | 19½ |

The temperature is about 800° F., the pressure about 3000 lbs. per square inch, the oil feed rate about 0.74 volumes of oil per volume of reaction space per hour, and the hydrogen rate is about 6000 cu. ft. per barrel of oil fed.

The yields and qualities of a water white burning distillate obtained from each reactor after about 2, 6 and 9 days of operation respectively are as follows:

| | Fresh molybdenum | | | Recovered molybdenum | | |
|---|---|---|---|---|---|---|
| Age of catalyst in days | 2 | 6 | 9 | 2 | 6 | 9 |
| Percent maximum water white distillate in product | 75 | 80 | 80 | 70 | 75 | 75 |
| Gravity A. P. I. | 42.9 | 44.5 | 45.3 | 45.9 | 45.9 | 45.8 |
| Viscosity (R. O.) | 400 | 415 | 390 | 410 | 405 | 405 |

These results indicate not only that the catalyst containing the recovered molybdenum sulfide is active from the beginning but that its activity is even greater than the ultimate activity of the catalyst containing the fresh molybdenum. Thus for example, after only 2 days operation the recovered molybdenum sulfide shows the same activity that it does on the 9th day, while the fresh molybdenum on the 2nd day is very much less active and does not reach its ultimate activity until about the 9th day. It should be understood that the fresh catalyst is activated by the hydrogenation treatment itself, the sulfur in the hydrocarbon oil being sufficient to accomplish this, although additional sulfur or sulfur-containing material may be mixed with the oil if necessary.

It is generally true that the higher the viscosity and A. P. I. gravity of a water white distillate the better are its burning qualities. It will be observed from the above data that the distillate produced in the reactor containing the recovered molybdenum catalyst has consistently higher gravities and the same or higher viscosities than that produced with the fresh molybdenum. In this respect, too, the recovered molybdenum is shown to be superior to the fresh molybdenum. A catalyst containing molybdenum sulfide recovered by the method described should therefore be particularly efficient and effective in the production of water white burning distillate by hydrogenation.

My invention is not limited by any theory of the mechanism of catalysis nor by any details which may have been given for illustrative purposes only, but is limited only by the following claims in which I wish to claim all novelty inherent in the invention.

I claim:

1. Method for recovering sulfides of metals of the VI group of the periodic system in a catalytically active form from spent catalytic material containing these sulfides and the sulfides of metals of the II and IV groups of the periodic system and other hydrochloric acid soluble materials, which comprises digesting the spent catalyst with strong hydrochloric acid, whereby all but the sulfides of the VI group metals are dissolved, separating the undissolved residue from the solution, and washing the residue.

2. Method according to claim 1 in which the spent catalyst is first treated with a suitable solvent to remove adhering hydrocarbon material.

3. Method according to claim 1 in which the residue undissolved by strong hydrochloric acid is treated with a dilute mineral acid before washing.

4. Method according to claim 1 in which the digestion with strong hydrochloric acid is carried out in the presence of an oxidizing agent.

5. Method for recovering a catalytically active form of molybdenum sulfide from a spent catalyst containing the sulfides of molybdenum, zinc and magnesium, which comprises treating the spent catalyst with carbon disulfide to remove hydrocarbon material, digesting the extracted catalyst with strong hydrochloric acid containing a small amount of an acid oxidizing agent, separating the residue from the solution and washing the residue first with a dilute mineral acid and then with water.

6. Process according to claim 5 in which the spent catalyst is digested with about 6 normal hydrochloric acid at substantially normal temperatures.

RHEA N. WATTS.